United States Patent [19]

Coran et al.

[11] 4,348,266

[45] Sep. 7, 1982

[54] IRRADIATED BLENDS OF POLYETHYLENE AND NEOPRENE RUBBER

[75] Inventors: Aubert Y. Coran; Raman Patel, both of Akron, Ohio

[73] Assignee: Monsanto Company, St. Louis, Mo.

[21] Appl. No.: 250,472

[22] Filed: Apr. 2, 1981

[51] Int. Cl.³ .................................................. C08F 8/00
[52] U.S. Cl. .............................. 204/159.17; 204/159.2
[58] Field of Search ......................... 204/159.17, 159.2

[56] References Cited

U.S. PATENT DOCUMENTS 4,104,210  8/1978  Coran et al. ......................... 260/4 R

OTHER PUBLICATIONS

Exxon Chemical Company Product Bulletin, Electron Beam Curing of Polymers, L. Spenadel, Jan. 1978, Ref. No.: 77ET 2507, pp. 1–28.

Plastics World, Feb. 1977, EB Processing Can Save Energy and Dollars, Robert C. Becker, pp. 48–50.

*Primary Examiner*—Melvyn I. Marquis
*Attorney, Agent, or Firm*—Larry R. Swaney

[57] ABSTRACT

Blends are described comprising polyethylene and neoprene rubber irradiated with ionizing radiation.

14 Claims, No Drawings

IRRADIATED BLENDS OF POLYETHYLENE AND NEOPRENE RUBBER

This invention relates to blend compositions of polyethylene and neoprene rubber and, more particularly, to irradiated blend compositions.

BACKGROUND OF THE INVENTION

Radiation cross-linked polyethylene is used as an insulation material in the wire and cable industry. Radiation curing of blends of polyethylene and diene rubber is disclosed as an alternative to chemical curatives in U.S. Pat. No. 4,104,210. Radiation cross-linked blends of polyethylene and EPDM rubber have been promoted for use in molded parts but they do not exhibit, even when containing cross-linking promotors, the tensile properties of chemically cross-linked blends. Radiation cross-linking of polymer blends offers processing advantages over chemically cross-linked blends and eliminates the use of chemical cross-linking agents which are expensive and may exhibit deleterious properties.

SUMMARY OF THE INVENTION

It has been discovered that irradiation with ionizing radiation of a composition comprising a blend of crystalline polyethylene and neoprene rubber results in an improved composition exhibiting superior properties including better tensile strength. Generally, a composition comprising a blend of about 10-75 parts by weight of crystalline polyethylene and, correspondingly, about 90-25 parts by weight of neoprene rubber is improved by irradiation with ionizing radiation. A preferred composition comprises a blend of about 20-60 parts by weight of crystalline polyethylene and, correspondingly, about 80-40 parts by weight of neoprene rubber.

Irradiation improves tension set, toughness, solvent resistance and high temperature properties of the composition. Irradiation also increases tensile strength, especially in compositions containing high proportions of neoprene rubber. Radiation dosages of about 1 to about 15 Megarads are satisfactory, with dosages of about 3 to 12 Megarads being preferred.

Irradiation causes cross-linking of both the polyethylene and the neoprene rubber. For thermoplastic compositions, it is essential that the radiation dose is not too high lest the polyethylene becomes excessively cross-linked so that the composition is no longer processable as a thermoplastic.

Compositions of the invention may also contain radiation cross-linking promotors. Radiation cross-linking promotors are particularly beneficial when the radiation dosages are in the lower portion of the range, for example, about 1-5 Megarads. Typically, the amount of cross-linking promotors used is about 1-10 parts by weight per 100 combined parts by weight of polyethylene and neoprene rubber. Preferably, about 2-5 parts by weight of cross-linking promotor are used per 100 total parts by weight of polymer. Polyfunctional olefinic compounds are suitable radiation cross-linking promotors, examples of which are trimethylol propane trimethacrylate, triallyl cyanurate, polyethylene glycol dimethacrylate and triallyl phosphate. For examples of other polyacrylates suitable for use as cross-linking promotors, see U.S. Pat. No. 4,104,329, Columns 3-8.

Any ionizing radiation including X-rays, gamma rays, or high energy electron beams is satisfactory for the practice of the invention. The high energy electron beam is a preferred source of radiation since the beam can be instantaneously turned on or off and because of the high efficiency of the process for converting electricity to high energy electrons. However, one advantage of X-rays and gamma rays is the thickness of the target composition is immaterial; whereas, target thickness must be taken into account with high energy electron beams, since penetration capability is voltage limited. Because of the high voltages required, it becomes impracticable with electron beams to irradiate effectively specimens much thicker than 3 centimeters. Generally, when the ionizing radiation source is a high energy electron beam, the composition to be irradiated is in a form of a sheet having a thickness of about 0.1-2 centimeters. Preferably, the composition is in the form of a sheet or molded part having a thickness of about 1-5 millimeters. The sheet does not necessarily have to be a flat plane, but may be cylindrical, such as a tubing or coating, for example, a covering of a wire or cable. Whenever the composition is in cylindrical form, it is important that the part be rotated as it passes through the electron beam to assure essentially uniform irradiation.

One embodiment of the invention comprises elastoplastic compositions exhibiting elastomeric properties, yet being processable as thermoplastics. The relative proportions of polyethylene and neoprene rubber of the elastoplastic compositions of the invention are not subject to absolute delineation because the limits vary, due to a number of factors including type, molecular weight, or molecular weight distribution of the polyethylene or neoprene rubber, the type of rubber and the radiation dose. The amount of polyethylene must be sufficient to impart thermoplasticity to the composition, and the amount of neoprene rubber must be sufficient to impart rubberlike elasticity to the composition. The term "rubberlike elasticity" means for the composition to have a tension set value of about 50% or less. The range of proportions for which the composition is elastoplastic may be ascertained in a few simple experiments by those skilled in the art by following the teachings herein. Generally, elastoplastic compositions of the invention comprise blends of about 20-45 parts by weight of polyethylene and, correspondingly, about 80-55 parts by weight of neoprene rubber per 100 total parts by weight of polyethylene and rubber. Blends containing lower proportions of polyethylene generally exhibit better tension set, whereas, blends containing higher proportions of polyethylene exhibit higher stress-strain properties, including true stress at break, TSB.

It is important for thermoplasticity that the rubber is present in the form of small dispersed particles, otherwise, the composition will either be weak or not processable as a thermoplastic. If the rubber is not dispersed and forms a somewhat continuous phase throughout the blend, a thermoset composition not processable as a thermoplastic may be obtained. The dispersed rubber particles must be small enough to maintain strength and thermoplasticity of the composition. If the particles are too large, weak, low strength blends are obtained. Compositions containing still larger particles may not be processable as thermoplastics. Accordingly, it is understood that in elastoplastic compositions of the invention, the particle size is small enough to maintain high strength and thermoplasticity. Generally, the rubber particles are of a size of about 50 microns number average or less. The smaller the particle size, the better the properties, including strength and processability. Preferably, the particle size is about 10 microns number average or less. The proper rubber particle size can be achieved by masticating an irradiated melt-mixed blend of polyethylene and neoprene rubber by using conventional rubber masticating equipment, for example, Banbury mixers, Brabender mixers and mixing extruders.

Thermoplastic compositions of the invention are all processable in an internal mixer, to give products which, upon transferring at temperatures above the softening or crystallizing point of the polyethylene to the rotating rolls of a rubber mill, form continuous sheets. The sheets are reprocessable in the internal mixer, after reaching temperatures above the softening or melting point of the polyethylene. The material is again transformed to the plastic state (molten state of the polyethylene) but upon passing the molten product through the rolls of the rubber mill a continuous sheet again forms. In addition, a sheet of thermoplastic composition of this invention can be cut into pieces and compression molded to give a single smooth sheet with complete knitting or fusion between the pieces. It is in the foregoing sense that "thermoplastic" will be herein understood. In addition, thermoplastic compositions of the invention are further processable to the extent that articles may be formed therefrom by extrusion, injection molding or calendering. It should be noted that thermoplastic compositions can be fabricated into thick sections since the radiation curing process is carried out before fabrication.

Neoprene rubber satisfactory for the practice of the invention is a rubbery polymer of chloroprene (2-chlorobutadiene). Various grades of polychloroprene rubber hereto referred to as neoprene rubber are commercially available under the tradenames of Baypren, Neoprene, and Petro-Tex Neoprene. See *Rubber World Blue Book,* "Materials and Compounding Ingredients for Rubber", 1975 Edition, pages 433–437 and *Encyclopedia of Polymer Science and Technology,* Vol. 3, pages 705–730.

Crystalline polyethylene satisfactory for the practice of the invention comprises thermoplastic high molecular weight resin made by polymerization of ethylene by either high pressure or low pressure processes. Crystalline polyethylene is a commodity product available from many commercial sources.

The properties of the compositions of the invention may be modified by addition of ingredients which are conventional in the compounding of neoprene rubber and polyethylene. Examples of such ingredients include carbon black, silica, titanium dioxide, pigments, clay, silanes, titanates or other coupling agents, stabilizers, antidegradants, plasticizers, processing aids, adhesives, tackifiers, wax, and discontinuous fibers such as wood cellulose or glass fibers, etc. The addition of particulate filler, preferably prior to irradiation, is particularly recommended. Preferably, the particulate filler is masterbatched with the neoprene rubber and the masterbatch is then mixed with the polyethylene. Particulate fillers such as carbon black, silica, or silane treated clay, improve the tensile strength. Typical additions of particulate fillers or reinforcement fillers such as carbon black comprise about 20–150 parts by weight of filler per 100 parts of rubber. The amount of particulate filler which can be used depends, at least in part, upon the type of filler and the presence of other ingredients such as plasticizer.

Thermoplastic compositions of the invention are useful for making a variety of articles such as tires, hoses, belts, gaskets, moldings and molded parts. They are particularly useful for making articles by extrusion, injection molding and compression molding techniques. Compositions of the invention are also useful for blending with other thermoplastics, in particular, various polyolefin resins. The compositions of the invention are blended with thermoplastics using conventional mixing equipment. The properties of the blend depend upon the proportions. Generally, the amount is such that the blend contains sufficient proportion of each component to obtain the desired effect.

The stress-strain properties of compositions of this invention are determined by ASTM procedure D-1708-66. Specimens are pulled with an Instron tester at 2.54 cm. per minute up to 30% elongation and then 25.4 cm. per minute to failure. The term "elastomeric" as used herein and in the claims means a composition which possesses the property of forcibly retracting within ten minutes to less than 160% of its original length after being stretched at room temperature to twice its unstressed length and held for ten minutes before release. True streass at break (TSB) is the tensile strength at break multiplied by the extension ratio also at break, extension ratio being the length of a tensile test specimen at break divided by the original, unstressed length of the test specimen. Alternately, extension ratio is 1.00 plus 1/100 of the percent ultimate elongation. Especially preferred compositions of the invention are rubbery compositions having tension set values of 50% or less.

DESCRIPTION OF THE PREFERRED EMBODIMENTS

Compositions illustrating the invention are prepared by charging equal weight portions of thermoplastic crystalline polyethylene (Marlex EHM 6006) and neoprene rubber (Neoprene W) to a Brabender mixer with an oil bath temperature of about 190° C. and masticating the mixture for about 3 minutes after the polyethylene is melted. The composition is removed, then returned to the mixer and masticated again for 2 minutes. The composition is removed and formed by pressure into flat sheets about 3–3.5 millimeters thick. The sheets are irradiated by electron beams at the indicated dosages by means of a Dynamitron Particle Accelerator. The irradiated sheet is masticated in a Brabender mixer as before, removed, cooled and compression molded at 225° C. The properties of the compression molded sheets are shown in Table 1.

Stock 1 is a non-irradiated control blend. Stocks 2, 3, and 4, compositions of the invention, are irradiated by electron beam at 1, 5, and 10 Megarad doses, respectively. Stock 5 is another control blend which is chemically cross-linked by dynamic vulcanization with a curative system comprising (all parts by weight) 2.0 parts of m-phenylene bismaleimide (HVA-2), 0.5 parts of benzothiazyl disulfide, and 2.5 parts of zinc oxide per 100 parts of blend. The data indicates that irradiated compositions exhibit higher tensile strength and true stress at break, TSB, and lower tension set than the non-irradiated control. The data further show irradiated compositions exhibit better elongation and true stress at break, and at higher dosages higher tensile strengths than the chemically cross-linked control.

TABLE 1

| Sample No. | 1 | 2 | 3 | 4 | 5 |
|---|---|---|---|---|---|
| Dose, MR | 0 | 1 | 5 | 10 | 0(Chem.) |
| TS, MPa | 11.8 | 14.0 | 17.5 | 17.5 | 15.9 |
| $M_{100}$, MPa | 11.8 | 11.4 | 14.3 | 13.2 | 13.1 |
| E, MPa | 398 | 250 | 265 | 211 | 268 |
| Utl. Elong., % | 560 | 530 | 450 | 380 | 320 |
| TSB, MPa | 77 | 89 | 96 | 85 | 67 |
| Ten. Set, % | 71 | 64 | 62 | 53 | 50 |

TABLE 2

| | (Parts by Weight) | | | |
|---|---|---|---|---|
| Sample No. | 1 | 2 | 3 | 4 |
| Polyethylene | 50.0 | 49.0 | 48.1 | 46.3 |
| Neoprene Rubber | 50.0 | 49.0 | 48.1 | 46.3 |
| Sartomer 351 | 0 | 2.0 | 3.8 | 7.4 |
| Properties | | | | |
| TS, MPa | 11.8 | 13.4 | 16.0 | 14.8 |
| $M_{100}$, MPa | 12.2 | 13.3 | 12.1 | 11.5 |
| E, MPa | 216 | 257 | 200 | 190 |
| Utl. Elong., % | 360 | 350 | 440 | 390 |
| Ten. Set, % | 64 | 65 | 58 | 58 |
| TSB, MPa | 55 | 60 | 87 | 72 |

Compositions of the invention containing radiation cross-linking promotor are shown in Table 2. The compositions are prepared as in Table 1 except a radiation cross-linking promotor, trimethylol propane triacrylate (Sartomer 351), is masticated with the two polymers in the indicated amounts. All compositions are irradiated with an electron beam as before with a dose of one Megarad. The data show that the incorporation of a radiation cross-linking promotor results in a substantial improvement in properties.

Although the invention has been illustrated by typical examples, it is not limited thereto. Changes and modifications of the examples of the invention herein chosen for purposes of disclosure can be made which do not constitute departure from the spirit and scope of the invention.

We claim:

1. A composition comprising a blend of about 10–75 parts by weight of crystalline polyethylene, and, correspondingly, about 90–25 parts by weight of neoprene rubber wherein the composition is irradiated with an ionizing radiation dose of about 1 to 15 M Rads.

2. The composition of claim 1 which comprises about 20–60 parts by weight of crystalline polyethylene, and, correspondingly, about 80–40 parts by weight of neoprene rubber wherein the radiation dose is about 3 to about 12 M Rads.

3. The composition of claim 2 which is prepared by directing a high energy electron beam toward the composition in the form of a sheet having a thickness of about 0.1–2 centimeters for the time necessary to receive the desired dosage.

4. The composition of claim 3 containing a radiation cross-linking promotor.

5. The composition of claim 4 in which the thickness of the sheet is about 1–5 millimeters.

6. The composition of claim 5 in which the neoprene rubber is in the form of discrete dispersed particles and the composition is processable as a thermoplastic.

7. The composition of claim 6 which comprises about 20–45 parts by weight of crystalline polyethylene, and, correspondingly, about 80–55 parts by weight of neoprene rubber and which is elastomeric.

8. The composition of claim 7 in which the neoprene rubber particles are of a size of about 50 microns number average or less.

9. The composition of claim 8 in which the neoprene rubber particle size is about 0.1 to 10 microns number average.

10. An elastoplastic composition comprising a blend of crystalline polyethylene, in an amount sufficient to impart thermoplasticity to the composition, and neoprene rubber in the form of dispersed particles of a size small enough to maintain thermoplasticity of the composition and which rubber is present in an amount sufficient to impart rubberlike elasticity to the composition wherein the composition is irradiated with an ionizing radiation dose of about 1 to 15 M Rads.

11. The composition of claim 10 comprising about 20 to about 45 parts by weight of crystalline polyethylene, and, correspondingly, about 80 to about 55 parts by weight of neoprene rubber wherein the radiation dose is about 3 to about 12 M Rads.

12. The composition of claim 11 which is prepared by directing a high energy electron beam toward the composition in the form of a sheet having a thickness of about 0.1–2 centimeters for the time necessary to receive the desired dosage.

13. The composition of claim 12 in which the thickness of the sheet is about 1–5 millimeters and the neoprene rubber particles are of a size of about 50 microns number average or less.

14. The composition of claim 13 containing a radiation cross-linking promotor.

* * * * *